US011644302B2

(12) United States Patent
Ma et al.

(10) Patent No.: US 11,644,302 B2
(45) Date of Patent: May 9, 2023

(54) METHOD AND APPARATUS FOR DETERMINING POSE INFORMATION OF A ROBOT, DEVICE AND MEDIUM

(71) Applicant: Keenon Robotics Co., Ltd., Shanghai (CN)

(72) Inventors: Shuai Ma, Shanghai (CN); Yuanxun Ma, Shanghai (CN); Yayun Yang, Shanghai (CN); Lin He, Shanghai (CN)

(73) Assignee: Keenon Robotics Co., Ltd., Shanghai (CN)

( * ) Notice: Subject to any disclaimer, the term of this patent is extended or adjusted under 35 U.S.C. 154(b) by 84 days.

(21) Appl. No.: 17/320,566

(22) Filed: May 14, 2021

(65) Prior Publication Data

US 2022/0026194 A1 Jan. 27, 2022

(30) Foreign Application Priority Data

Jul. 24, 2020 (CN) ........................ 202010722649.X

(51) Int. Cl.
*G01B 11/00* (2006.01)
*G05D 1/02* (2020.01)

(52) U.S. Cl.
CPC ........... *G01B 11/00* (2013.01); *G05D 1/0234* (2013.01)

(58) Field of Classification Search
CPC .............................. G01B 11/00; G05D 1/0234
See application file for complete search history.

(56) References Cited

U.S. PATENT DOCUMENTS

2011/0280472 A1* 11/2011 Wallack .................... G06T 7/80 901/14

FOREIGN PATENT DOCUMENTS

| | | |
|---|---|---|
| CN | 107030699 | 8/2017 |
| CN | 107689063 | 2/2018 |
| CN | 109829953 | 5/2019 |
| CN | 109829953 A * | 5/2019 |
| CN | 110634164 | 12/2019 |
| JP | H106264 | 1/1998 |

OTHER PUBLICATIONS

Office Action in related CN202010722649.X dated Jul. 19, 2021.

* cited by examiner

*Primary Examiner* — Aaron L Troost
(74) *Attorney, Agent, or Firm* — Woodard, Emhardt, Henry, Reeves & Wagner, LLP

(57) ABSTRACT

Provided are a method and apparatus for determining pose information of a robot, a device and a medium. The method includes: fitting a target curve according to a motion trajectory of an image module relative to a target label when the robot rotates; determining a coordinate offset of the image module relative to a body of the robot according to the target curve, and determining a relative distance between the image module and the target label according to the image module; and determining the pose information of the robot according to the coordinate offset and the relative distance.

18 Claims, 3 Drawing Sheets

Fit a target curve according to a motion trajectory of an image module relative to a target label when the robot rotates — S110

Determine a coordinate offset of the image module relative to a body of the robot according to the target curve, and determine a relative distance between the image module and the target label according to the image module — S120

Determine the pose information of the robot according to the coordinate offset and the relative distance — S130

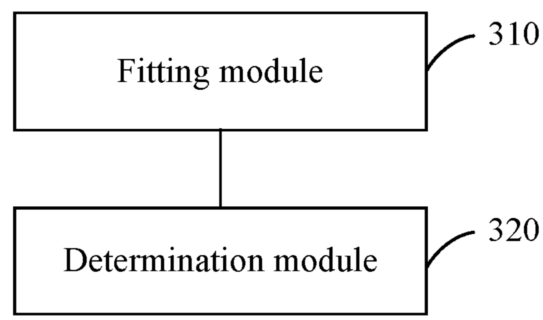
FIG. 3
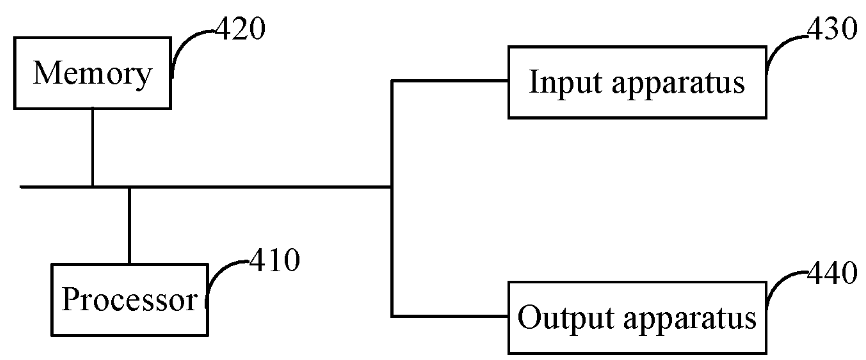
FIG. 4
FIG. 5

METHOD AND APPARATUS FOR DETERMINING POSE INFORMATION OF A ROBOT, DEVICE AND MEDIUM

CROSS-REFERENCES TO RELATED APPLICATION

This application claims priority to a Chinese patent application No. 202010722649.X, filed on Jul. 24, 2020, the disclosure of which is incorporated herein by reference in its entirety.

TECHNICAL FIELD

Embodiments of the present disclosure relate to the positioning technology of a robot, and in particular to a method and apparatus for determining pose information of a robot, a device and a medium.

BACKGROUND

Mobile robots have been widely used in military, industrial and civil fields at present and are still in continuous development. Mobile robot technologies have made gratifying progress and obtained encouraging research results, but they still need a long time to develop for meeting practical application requirements. With the continuous improvement of sensing technologies, intelligent technologies and computing technologies, intelligent mobile robots will certainly provide more convenience for people in production and life. At present, a commonly used positioning method is to achieve positioning of a robot based on a label, that is, to use the camera of a robot to acquire the position of the label so as to achieve positioning of the robot.

The defect of the preceding solution is as follows: the machining data of the robot when the robot leaves a factory may change in the daily use process, so once an offset in position occurs between the camera and the robot, the determined pose information of the robot has a relatively large error, and the use of the robot is seriously affected.

SUMMARY

The embodiments of the present application provide a method and apparatus for determining pose information of a robot, a device and a medium so that pose information of a robot can be accurately determined through a relative offset between an image module and the robot.

In a first aspect, the embodiments of the present disclosure provide a method for determining pose information of a robot. The method includes the steps described below.

A target curve is fitted according to a motion trajectory of an image module relative to a target label when the robot rotates.

A coordinate offset of the image module relative to a body of the robot is determined according to the target curve, and a relative distance between the image module and the target label is determined according to the image module.

The pose information of the robot is determined according to the coordinate offset and the relative distance.

Optionally, the step of fitting a target curve according to a motion trajectory of an image module relative to a target label when the robot rotates includes the steps described below.

Coordinates of at least three first nodes of the image module when the robot rotates are acquired, and an initial curve is fitted according to the coordinates of the at least three first nodes.

Coordinates of a second node of the image module when the robot rotates are acquired, and the initial curve is corrected according to the coordinates of the second node and an error threshold to obtain a corrected curve.

In response to detecting that an intra-class distance of the corrected curve is less than a distance threshold, the corrected curve is used as the target curve.

Optionally, the step of acquiring coordinates of a second node of the image module when the robot rotates and correcting the initial curve according to the coordinates of the second node and an error threshold to obtain a corrected curve includes the steps described below.

An error between the coordinates of the second node and the initial curve is calculated.

In response to the error between the coordinates of the second node and the initial curve being less than the error threshold, the coordinates of the second node and the initial curve are fitted to obtain the corrected curve.

Optionally, the step of determining the coordinate offset of the image module relative to the body of the robot according to the target curve includes the steps described below.

Coordinates of a center and a radius of the target curve are determined.

The coordinate offset of the image module relative to the body of the robot is determined according to the coordinates of the center and the radius.

Optionally, the step of determining the relative distance between the image module and the target label according to the image module includes the steps described below.

The target label carrying position information is fixed above a motion region of the robot.

The relative distance between the image module and the target label is determined according to the target label photographed by the image module.

Optionally, the step of determining the pose information of the robot according to the coordinate offset and the relative distance includes the steps described below.

Current global coordinates of the image module are determined according to current global coordinates of the target label and the relative distance.

The pose information of the robot is determined according to the current global coordinates of the image module and the coordinate offset.

In a second aspect, the embodiments of the present disclosure provide an apparatus for determining pose information of a robot. The apparatus includes a fitting module and a determination module.

The fitting module is configured to fit a target curve according to a motion trajectory of an image module relative to a target label when the robot rotates.

The determination module is configured to determine a coordinate offset of the image module relative to a body of the robot according to the target curve and determine a relative distance between the image module and the target label according to the image module.

The determination module is further configured to determine the pose information of the robot according to the coordinate offset and the relative distance.

Optionally, the fitting module is specifically configured to perform the steps described below.

Coordinates of at least three first nodes of the image module when the robot rotates are acquired, and an initial curve is fitted according to the coordinates of the at least three first nodes.

Coordinates of a second node of the image module when the robot rotates are acquired, and the initial curve is corrected according to the coordinates of the second node and an error threshold to obtain a corrected curve.

In response to detecting that an intra-class distance of the corrected curve is less than a distance threshold, the corrected curve is used as the target curve.

Optionally, the fitting module is further specifically configured to perform the steps described below.

An error between the coordinates of the second node and the initial curve is calculated.

In response to the error between the coordinates of the second node and the initial curve being less than the error threshold, the coordinates of the second node and the initial curve are fitted to obtain the corrected curve.

Optionally, the determination module is specifically configured to perform the steps described below.

Coordinates of a center and a radius of the target curve are determined.

The coordinate offset of the image module relative to the body of the robot is determined according to the coordinates of the center and the radius.

Optionally, the determination module is further specifically configured to perform the steps described below.

The target label carrying position information is fixed above a motion region of the robot.

The relative distance between the image module and the target label is determined according to the target label photographed by the image module.

Optionally, the determination module is further specifically configured to perform the steps described below.

Current global coordinates of the image module are determined according to current global coordinates of the target label and the relative distance.

The pose information of the robot is determined according to the current global coordinates of the image module and the coordinate offset.

In a third aspect, the embodiments of the present disclosure further provide an electronic device. The electronic device includes one or more processors and a storage apparatus.

The storage apparatus is configured to store one or more programs.

The one or more programs are configured to, when executed by the one or more processors, cause the one or more processors to implement any method for determining pose information of the robot described in the embodiments of the present disclosure.

In a fourth aspect, the embodiments of the present disclosure further provide a computer-readable storage medium having a computer program stored thereon, where the computer program is configured to, when executed by a processor, implement any method for determining pose information of the robot described in the embodiments of the present disclosure.

According to the embodiments of the present disclosure, a target curve is fitted according to a motion trajectory of an image module relative to a target label when the robot rotates, a coordinate offset of the image module relative to a body of the robot is determined according to the target curve, and a relative distance between the image module and the target label is determined according to the image module. Thus, the pose information of the robot is determined. According to the embodiments of the present disclosure, the pose information of the robot can be accurately determined through the relative offset between the image module and the robot in a case where an offset occurs on the image module.

BRIEF DESCRIPTION OF DRAWINGS

FIG. 3 is a structure diagram of an apparatus for determining pose information of a robot according to embodiment three of the present disclosure;

FIG. 4 is a structure diagram of an electronic device according to embodiment four of the present disclosure;

FIG. 5 is a schematic diagram showing fitting of a target curve according to embodiment one of the present disclosure;

DETAILED DESCRIPTION

Figure 1:
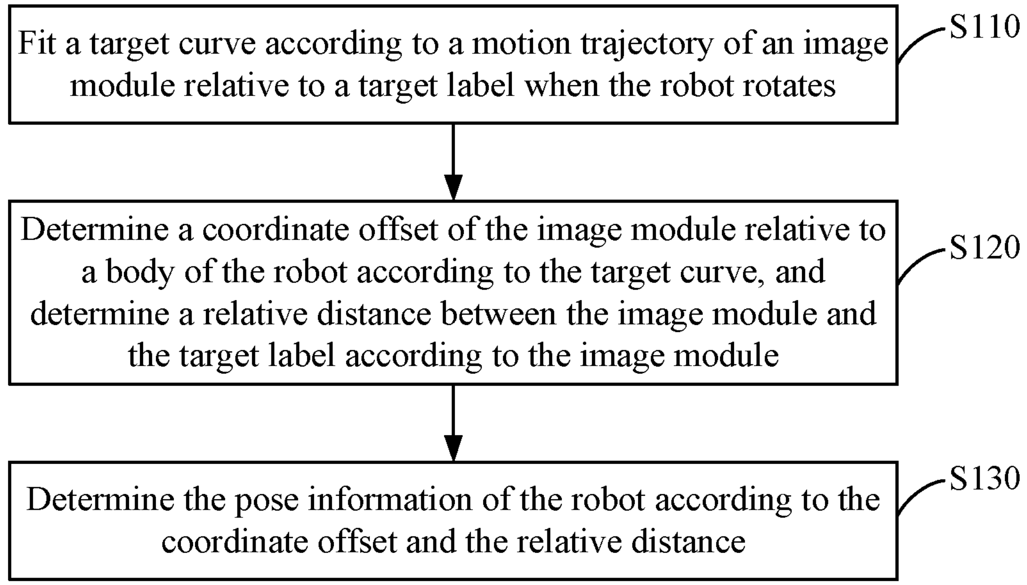
FIG. 1 is a flowchart of a method for determining pose information of a robot according to embodiment one of the present disclosure.

The present disclosure is further described below in detail in conjunction with drawings and embodiments. It is to be understood that the embodiments described herein are merely intended to explain the present disclosure and not to limit the present disclosure. Additionally, it is to be noted that for ease of description, merely part, not all, of the structures related to the present disclosure are illustrated in the drawings.

Embodiment One

FIG. 1 is a flowchart of a method for determining pose information of a robot according to embodiment one of the present disclosure. This embodiment is applicable to the case where the image module of the robot is corrected to achieve accurate positioning of the robot. The method in this embodiment may be executed by an apparatus for determining pose information of a robot. The apparatus may be implemented in the form of hardware and/or software and may be configured in an electronic device. The electronic device is preferably a robot, such as a disinfection robot or a delivery robot. The method for determining pose information of a robot described in any embodiment of the present application can be implemented. As shown in FIG. 1, the method specifically includes the steps described below.

In S110, a target curve is fitted according to a motion trajectory of an image module relative to a target label when the robot rotates.

In this embodiment, the robot rotates by receiving an automatic calibration image module instruction. The instruction may be manually operated, for example, in a manner of manually pressing a preset automatic calibration hardware button on the body of the robot; or an automatic calibration image module instruction is sent regularly by a control module through setting of the robot, so that the robot can rotate in situ; or when starting up, the robot is controlled to rotate so as to calibrate the image module.

Specifically, the image module is an acquisition component installed on the body of the robot, and the acquisition component can be used to obtain the surrounding images in the walking process of the robot, so that more accurate position information is provided for the navigation system of the robot and the accurate positioning of the robot is thus achieved; for example, the image module may be a camera installed and fixed at the front end of the head of the robot.

As all parts of the body of the robot need to be installed manually when the robot leaves the factory, a relatively large installation error may occur when the image module is installed, thus resulting in an offset in position and direction between the image module and the body of the robot and affecting the normal operation of the robot to some extent in the later period. According to the motion trajectory of the image module relative to a label when the robot rotates, it can be effectively seen whether the image module is offset from the fixed installation position of the image module on the body of the robot. Without considering any error, the acquired motion trajectory of the image module when the robot moves should be a point whose direction changes constantly and position does not change; considering the jitter and other errors that may occur in a motion process, the actual pose data of the robot should satisfy Gaussian distribution near a certain point; if an offset occurs on the installation of the image module of the robot, the acquired motion trajectory will present Gaussian distribution on a circle as shown in FIG. 5; in this embodiment, the target curve can be fitted according to the motion trajectory of the robot based on the method of least squares.

In S120, coordinate offset of the image module relative to a body of the robot is determined according to the target curve, and a relative distance between the image module and the target label is determined according to the image module.

In this embodiment, the coordinate offset of the image module relative to the body of the robot is the coordinate offset of the image module relative to the preset fixed installation position of the image module on the robot (such as the very front end of the head of the robot). The coordinate offset includes a distance offset and a direction offset. The image module will photograph an image of the target label in a rotation process of the robot. According to the photographed image of the target label, coordinate information of the target label and relative position information of the image module are obtained, and a relative distance between the image module and the target label can be obtained by mathematical proportional operation.

In S130, the pose information of the robot is determined according to the coordinate offset and the relative distance.

In this embodiment, the pose information of the robot includes the position coordinates and orientation of the robot. The position coordinates of the robot are the abscissa and ordinate of the robot at a current position obtained through establishment of a global coordinate system in the room where the robot is located. The orientation of the robot is the deviation angle between the front face of the robot at the current position and a horizontal coordinate axis. The pose information of the robot can be accurately determined through the relative offset between the image module and the robot in a case where an offset occurs on the image module.

According to the embodiments of the present disclosure, a target curve is fitted according to a motion trajectory of an image module relative to a target label when the robot rotates, a coordinate offset of the image module relative to a body of the robot is determined according to the target curve, and a relative distance between the image module and the target label is determined according to the image module. The pose information of the robot is determined according to the coordinate offset and the relative distance. The pose information of the robot can be accurately determined through the relative offset between the image module and the robot in a case where an offset occurs on the image module.

Embodiment Two

Figure 2:
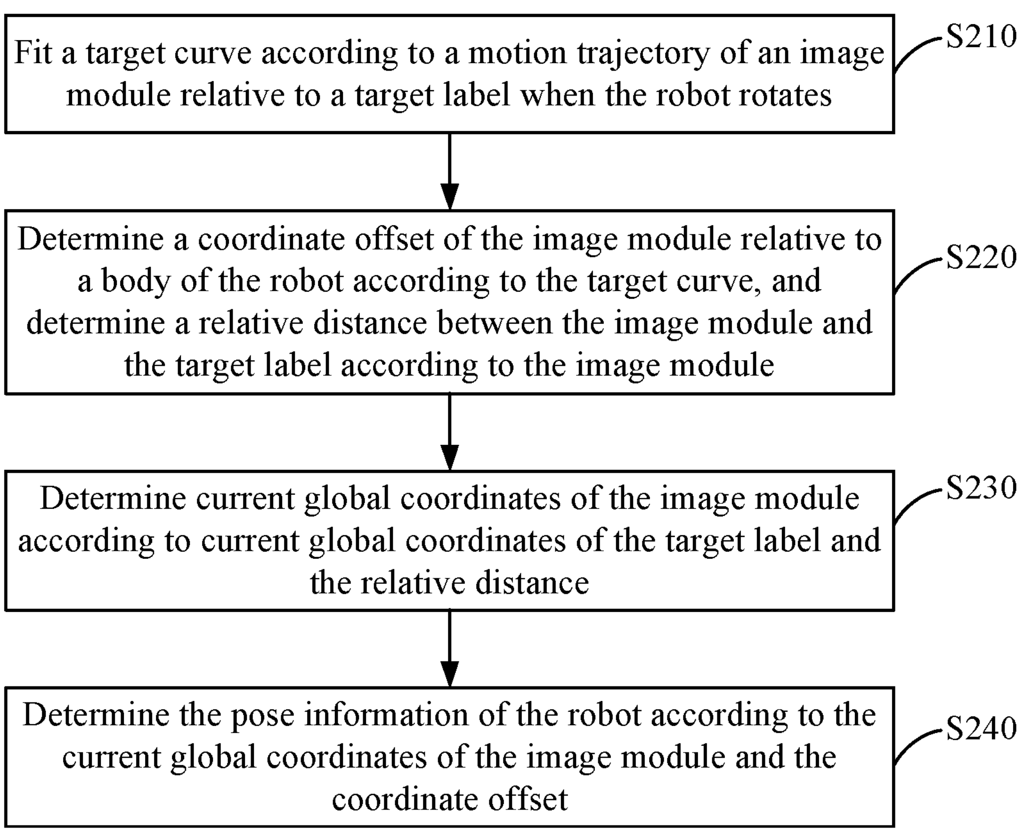
FIG. 2 is a flowchart of a method for determining pose information of a robot according to embodiment two of the present disclosure.

FIG. 2 is a flowchart of a method for determining pose information of a robot according to embodiment two of the present disclosure. This embodiment is obtained through the expansion and optimization of the preceding embodiment and can be combined with any optional solution among the preceding technical solutions. As shown in FIG. 2, the method includes the steps described below.

In S210, a target curve is fitted according to a motion trajectory of an image module relative to a target label when the robot rotates.

In S220, a coordinate offset of the image module relative to a body of the robot is determined according to the target curve, and a relative distance between the image module and the target label is determined according to the image module.

In S230, current global coordinates of the image module are determined according to current global coordinates of the target label and the relative distance.

In this embodiment, the relative distance is relative coordinates of the image module and the target label in practice. The position information about global coordinates of the target label has been input into a storage unit in advance. Therefore, the current global coordinates of the target label can be directly determined, and the current global coordinates of the image module can be converted according to the current global coordinates of the target label and the relative distance. The global coordinates are obtained from a spatial coordinate system constructed through a selection of the origin of coordinates from the local space where the robot moves.

In S240, the pose information of the robot is determined according to the current global coordinates of the image module and the coordinate offset.

In this embodiment, the global coordinates, i.e., abscissa and ordinate in the global coordinate system, of the robot at the current position can be determined according to the coordinate offset of the image module and the current global coordinates of the image module; the orientation from the image module on the body of the robot to the target label is the orientation of the robot at the current position, and thus the pose information of the robot is determined.

Optionally, the step of fitting a target curve according to a motion trajectory of an image module relative to a target label when the robot rotates includes the steps described below.

Coordinates of at least three first nodes of the image module when the robot rotates are acquired, and an initial curve is fitted according to the coordinates of the at least three first nodes.

Coordinates of a second node of the image module when the robot rotates are acquired, and the initial curve is corrected according to the coordinates of the second node and an error threshold to obtain a corrected curve.

In response to detecting that an intra-class distance of the corrected curve is less than a distance threshold, the corrected curve is used as the target curve.

In this embodiment, when the robot starts to rotate, coordinates of at least three first nodes during the motion of the robot are acquired to fit the initial curve since three points can determine a circle, and the initial curve is a curve circle. The coordinates of the three first nodes are acquired at a first time moment, a second time moment and a third time moment of the acquisition point set by the robot; or the coordinates of the three first nodes are coordinates of a first point, coordinates of a second point and coordinates of a third point acquired during the motion of the robot. Optionally, coordinates of all first nodes acquired during the rotation of the robot for one cycle may be acquired to fit a circle by the method of least squares, and the circle is used as the target curve.

Coordinates of a second node are coordinates of a point required for correcting the fitted initial circle after the initial curve circle has been fitted. For example, coordinates of the second node may be coordinates of a point acquired by the robot at a fourth time moment in an ideal state or coordinates of a fourth point acquired since the beginning of acquisition; or coordinates of a plurality of points are acquired and averaged to obtain average point coordinates, so that the initial circle can be corrected to obtain the corrected curve.

Since the intra-class distance can effectively represent whether a particle swarm acquired after calibration is in an aggregation distribution state near a pose, that the intra-class distance is less than the distance threshold is used as a cut-off condition for correcting the pose of the image module in this embodiment. If it is detected in a correction process that the intra-class distance is less than the distance threshold, the particles are in the aggregation distribution state and no longer present a curve circle distribution, so the correction is completed, the robot stops rotation, and pose parameters of the image module subjected to the correction are used as actual parameters. The distance threshold may be set to 0.01. In this embodiment, determination based on the intra-class distance and the distance threshold is adopted so that the accuracy of a correction result can be effectively improved.

Specifically, the intra-class distance can be calculated according to the following formula (1):

$$d^2(\Omega_i) = \frac{1}{N_i^2}\sum_{k=1}^{N_i}\sum_{l=1}^{N_i} d^2(X_k^{(i)}, X_l^{(i)}). \quad (1)$$

$d^2(\Omega_i)$ denotes the intra-class distance of class $\Omega_i$, $\Omega_i$ denotes a corrected curve (sample set), $N_i$ denotes the number of samples in $\Omega_i$, $X_k^{(i)}$ denotes the k-th sample in $\Omega_i$, and $X_l^{(i)}$ denotes the l-th sample in $\Omega_i$.

Optionally, the step of acquiring coordinates of a second node of the image module when the robot rotates and correcting the initial curve according to the coordinates of the second node and an error threshold to obtain a corrected curve includes the steps described below.

An error between the coordinates of the second node and the initial curve is calculated.

In response to the error between the coordinates of the second node and the initial curve being less than the error threshold, the coordinates of the second node and the initial curve are fitted to obtain the corrected curve.

In this embodiment, the error between the coordinates of the second node and the initial curve is the difference between the coordinates of the second node and the equation of the initial curve. For example, the error between the coordinates of the second node and the initial curve is obtained from the following formula (2): $D=|(x_i-x_c)^2+(y_i-y_c)^2-r^2|$ (2).

D denotes the error between the coordinates of the second node and the initial curve, $x_i$ denotes the abscissa of the second node, $y_i$ denotes the ordinate of the second node, r denotes the radius of the initial curve (circle), $x_c$ denotes the abscissa of the center of the initial curve, and $y_c$ denotes the ordinate of the center of the initial curve.

If the error D is less than the error threshold, the coordinates of the second node are considered valid, and the initial curve is corrected in combination with the coordinates of the second node to obtain the corrected curve. In this embodiment, the smoothness of the fitted target curve can be improved through a continuous correction of the initial curve.

Optionally, the step of determining the coordinate offset of the image module relative to the body of the robot according to the target curve includes the steps described below.

Coordinates of a center and a radius of the target curve are determined.

The coordinate offset of the image module relative to the body of the robot is determined according to the coordinates of the center and the radius.

In this embodiment, the radius of the target curve is the position offset of the image module relative to the body of the robot. The center of the target curve is the center position of the robot. All points on the circumference of the formed target curve form the motion trajectory of the image module on the body of the robot. A fixed functional relationship between the coordinates of the image module and the coordinates of the center can be obtained according to the coordinates of the center and radius of the target curve. In this manner, the coordinate offset of the image module relative to the body of the robot is expressed by the fixed functional relationship, and thus the coordinate offset of the image module relative to the body of the robot is effectively determined.

Optionally, the step of determining the relative distance between the image module and the target label according to the image module includes the steps described below.

The target label carrying position information is fixed above a motion region of the robot.

The relative distance between the image module and the target label is determined according to the target label photographed by the image module.

Figure 6:
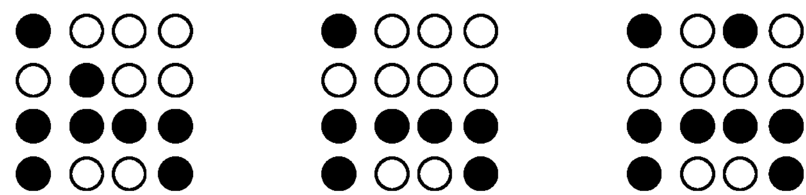
FIG. 6 is a schematic diagram showing a label according to embodiment two of the present disclosure.
Figure 7:
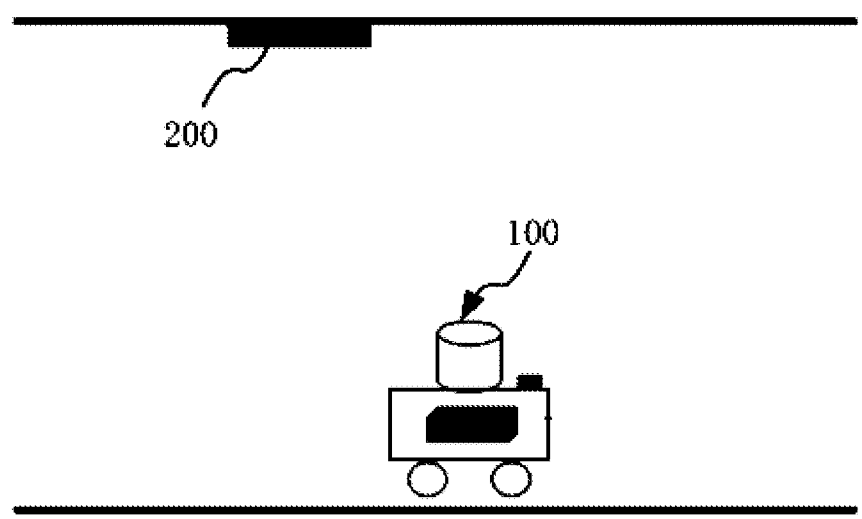
FIG. 7 is a schematic diagram showing positions of a robot and a target label according to embodiment two of the present disclosure.

In this embodiment, a label is fixed in a region of a ceiling above the robot. As specifically shown in FIG. 6, FIG. 6 shows three types of labels, and a point matrix obtained from a combination of dark regions and white regions is used for representing position information of a label. A black region represents an occupied state, a white region represents an idle state, the label states of four corner points are fixed (the states of the four corner points are used for distinguishing different rooms, and the color depths of the four corner points are not specifically limited, as long as the four corners of a label are unified with four corners of another label in one room and are not repeated with those in other rooms), and the label information is input into the storage unit in advance. The target label is a label photographed by the image module during the rotation of the robot. FIG. 7 is a schematic diagram showing positions of a robot and a target label. A module 100 is an image module installed at the front end of the head of the robot; a module 200 is a target label affixed to the ceiling and is, for example, one of the three types of labels in FIG. 6.

In the process of rotation, the robot can photograph a certain label (that is, the target label mentioned in this embodiment) so that the relative distance between the image module and the target label is obtained. In this embodiment, the target label photographed by the robot in the motion process is used as reference so that the relative distance between the image module and the target label can be rapidly determined.

Embodiment Three

FIG. 3 is a structure diagram of an apparatus for determining pose information of a robot according to embodiment three of the present disclosure. This embodiment is applicable to the case where the image module of the robot is corrected to achieve accurate positioning of the robot. The apparatus is configured in an electronic device and can implement the method for determining pose information of a robot described in any embodiment of the present application. The apparatus specifically includes a fitting module 310 and a determination module 320.

The fitting module 310 is configured to fit a target curve according to a motion trajectory of an image module relative to a target label when the robot rotates.

The determination module 320 is configured to determine a coordinate offset of the image module relative to a body of the robot according to the target curve and determine a relative distance between the image module and the target label according to the image module.

The determination module 320 is further configured to determine the pose information of the robot according to the coordinate offset and the relative distance.

Optionally, the fitting module 310 is specifically configured to perform the steps described below.

Coordinates of at least three first nodes of the image module when the robot rotates are acquired, and an initial curve is fitted according to the coordinates of the at least three first nodes.

Coordinates of a second node of the image module when the robot rotates are acquired, and the initial curve is corrected according to the coordinates of the second node and an error threshold to obtain a corrected curve.

In response to detecting that an intra-class distance of the corrected curve is less than a distance threshold, the corrected curve is used as the target curve.

Optionally, the fitting module 310 is further specifically configured to perform the steps described below.

An error between the coordinates of the second node and the initial curve is calculated.

In response to the error between the coordinates of the second node and the initial curve being less than the error threshold, the coordinates of the second node and the initial curve are fitted to obtain the corrected curve.

Optionally, the determination module 320 is specifically configured to perform the steps described below.

Coordinates of a center and a radius of the target curve are determined.

The coordinate offset of the image module relative to the body of the robot is determined according to the coordinates of the center and the radius.

Optionally, the determination module 320 is further specifically configured to perform the steps described below.

The target label carrying position information is fixed above a motion region of the robot.

The relative distance between the image module and the target label is determined according to the target label photographed by the image module.

Optionally, the determination module 320 is further specifically configured to perform the steps described below.

Current global coordinates of the image module are determined according to current global coordinates of the target label and the relative distance.

The pose information of the robot is determined according to the current global coordinates of the image module and the coordinate offset.

According to the apparatus for determining pose information of a robot in embodiment three, the pose information of the robot can be accurately determined through the relative offset between the image module and the robot in a case where an offset occurs on the image module.

The apparatus for determining pose information of a robot provided in this embodiment of the present disclosure can execute the method for determining pose information of a robot provided in any embodiment of the present disclosure and has functional modules and beneficial effects corresponding to the execution method.

Embodiment Four

FIG. 4 is a structure diagram of an electronic device according to embodiment four of the present disclosure. As shown in FIG. 4, the electronic device includes a processor 410, a memory 420, an input apparatus 430 and an output apparatus 440. The number of processors 410 in the electronic device may be one or more, and one processor 410 is used as an example in FIG. 4. The processor 410, the memory 420, the input apparatus 430 and the output apparatus 340 in the electronic device may be connected through a bus or in other manners. In FIG. 4, the connection through the bus is used as an example.

The memory 420 is used as a computer-readable storage medium for storing software programs, computer-executable programs and modules, such as program instructions/modules corresponding to the method for determining pose information of a robot according to the embodiments of the present disclosure. The processor 410 executes software programs, instructions and modules stored in the memory 420 to perform various functional applications and data processing of the electronic device, that is, implements the method for determining pose information of a robot according to the embodiments of the present disclosure.

The memory 420 may mainly include a program storage region and a data storage region. The program storage region may store an operating system, at least one application required for functions. The data storage region may store data and the like created according to the use of the terminal. In addition, the memory 420 may include a high speed random access memory and may also include a nonvolatile memory such as at least one disk memory, flash memory or another nonvolatile solid-state memory. In some examples, the memory 420 may further include memories remotely disposed with respect to the processor 410, and these remote memories may be connected to the electronic device via a network. Examples of the preceding network include, but are not limited to, the Internet, an intranet, a local area network, a mobile communication network and a combination thereof.

The input apparatus 430 may be used for receiving inputted digital or character information and for generating key signal input related to user settings and function control of the electronic device. The input apparatus 430 may include a keyboard, a mouse and the like. The output apparatus 440 may include display devices such as a display screen.

Embodiment Five

This embodiment provides a storage medium including computer-executable instructions. The computer-executable instructions, when executed by a computer processor, are used for implementing the method for determining pose information of a robot according to the embodiments of the present disclosure.

In the storage medium including computer-executable instructions provided in the embodiments of the present disclosure, the computer-executable instructions implement not only the preceding method operations but also related operations in the method for determining pose information of a robot according to any embodiment of the present disclosure.

From the preceding description of embodiments, it will be apparent to those skilled in the art that the present disclosure may be implemented by means of software and necessary general-purpose hardware or may of course be implemented by hardware, but in many cases the former is a preferred embodiment. Based on this understanding, the technical solution provided in the present disclosure substantially, or the part contributing to the related art, may be embodied in the form of a software product. The software product is stored in a computer-readable storage medium, such as a computer floppy disk, a read-only memory (ROM), a random access memory (RAM), a flash, a hard disk or an optical disk, and includes several instructions for enabling a computer device (which may be a personal computer, a server or a network device) to perform the method according to each embodiment of the present disclosure.

It is to be noted that units and modules included in the embodiment of the apparatus are just divided according to functional logic but are not limited to such division, as long as the corresponding functions can be implemented. In addition, the specific names of the functional units are just used for distinguishing between each other and are not intended to limit the scope of the present disclosure.

What is claimed is:

1. A method for controlling a movement of a robot, comprising: controlling the robot to rotate;

fitting a target curve according to a motion trajectory of an image module relative to a target label when the robot rotates;

determining a coordinate offset of the image module relative to a body of the robot according to coordinates of a center and a radius of the target curve, and determining a relative distance between the image module and the target label according to the image module;

determining the pose information of the robot according to the coordinate offset and the relative distance; and controlling a movement of the robot according to the pose information.

2. The method of claim 1, wherein fitting the target curve according to the motion trajectory of the image module relative to the target label when the robot rotates comprises:

acquiring coordinates of at least three first nodes of the image module when the robot rotates, and fitting an initial curve according to the coordinates of the at least three first nodes;

acquiring coordinates of a second node of the image module when the robot rotates, and correcting the initial curve according to the coordinates of the second node and an error threshold to obtain a corrected curve; and in response to detecting that an intra-class distance of the corrected curve is less than a distance threshold, using the corrected curve as the target curve.

3. The method of claim 2, wherein acquiring the coordinates of the second node of the image module when the robot rotates, and correcting the initial curve according to the coordinates of the second node and the error threshold to obtain the corrected curve comprises:

calculating an error between the coordinates of the second node and the initial curve; and in response to the error between the coordinates of the second node and the initial curve being less than the error threshold, fitting the coordinates of the second node and the initial curve to obtain the corrected curve.

4. The method of claim 1, wherein determining the coordinate offset of the image module relative to the body of the robot according to the target curve comprises:

determining the coordinates of the center and the radius of the target curve; and determining the coordinate offset of the image module relative to the body of the robot according to the coordinates of the center and the radius.

5. The method of claim 1, wherein determining the relative distance between the image module and the target label according to the image module comprises:

fixing the target label carrying position information above a motion region of the robot; and determining the relative distance between the image module and the target label according to the target label photographed by the image module.

6. The method of claim 1, wherein determining the pose information of the robot according to the coordinate offset and the relative distance comprises:

determining current global coordinates of the image module according to current global coordinates of the target label and the relative distance; and determining the pose information of the robot according to the current global coordinates of the image module and the coordinate offset.

7. An electronic device, comprising:

at least one processor; and a storage apparatus, which is configured to store at least one program, wherein when executed by the at least one processor, the at least one program is configured to cause the at least one processor to implement the following steps:

controlling a robot to rotate;

fitting a target curve according to a motion trajectory of an image module relative to a target label when the robot rotates;

determining a coordinate offset of the image module relative to a body of the robot according to coordinates of a center and a radius of the target curve, and determining a relative distance between the image module and the target label according to the image module;

determining the pose information of the robot according to the coordinate offset and the relative distance; and controlling a movement of the robot according to the pose information.

8. The electronic device of claim 7, wherein the at least one program is configured to cause the at least one processor to fit the target curve according to the motion trajectory of the image module relative to the target label when the robot rotates by:

acquiring coordinates of at least three first nodes of the image module when the robot rotates, and fitting an initial curve according to the coordinates of the at least three first nodes;

acquiring coordinates of a second node of the image module when the robot rotates, and correcting the initial curve according to the coordinates of the second node and an error threshold to obtain a corrected curve; and in response to detecting that an intra-class distance of the corrected curve is less than a distance threshold, using the corrected curve as the target curve.

9. The electronic device of claim 8, wherein the at least one program is configured to cause the at least one processor to implement acquire the coordinates of the second node of the image module when the robot rotates, and correcting the initial curve according to the coordinates of the second node and the error threshold to obtain the corrected curve by:

calculating an error between the coordinates of the second node and the initial curve; and in response to the error between the coordinates of the second node and the initial curve being less than the error threshold, fitting the coordinates of the second node and the initial curve to obtain the corrected curve.

10. The electronic device of claim 7, wherein the at least one program is configured to cause the at least one processor to determine the coordinate offset of the image module relative to the body of the robot according to the target curve by:

determining the coordinates of the center and the radius of the target curve; and determining the coordinate offset of the image module relative to the body of the robot according to the coordinates of the center and the radius.

11. The electronic device of claim 7, wherein the at least one program is configured to cause the at least one processor to determine the relative distance between the image module and the target label according to the image module by:

fixing the target label carrying position information above a motion region of the robot; and determining the relative distance between the image module and the target label according to the target label photographed by the image module.

12. The electronic device of claim 7, wherein the at least one program is configured to cause the at least one processor to determine the pose information of the robot according to the coordinate offset and the relative distance by:

determining current global coordinates of the image module according to current global coordinates of the target label and the relative distance; and determining the pose information of the robot according to the current global coordinates of the image module and the coordinate offset.

13. A non-transitory computer-readable storage medium, having a computer program stored thereon, wherein when executed by a processor, the computer program is configured to cause the processor to implement the following steps:

controlling a robot to rotate;

fitting a target curve according to a motion trajectory of an image module relative to a target label when the robot rotates;

determining a coordinate offset of the image module relative to a body of the robot according to coordinates of a center and a radius of the target curve, and determining a relative distance between the image module and the target label according to the image module;

determining the pose information of the robot according to the coordinate offset and the relative distance; and controlling a movement of the robot according to the pose information.

14. The storage medium of claim 13, wherein the computer program is configured to cause the processor to fit the target curve according to the motion trajectory of the image module relative to the target label when the robot rotates by:

acquiring coordinates of at least three first nodes of the image module when the robot rotates, and fitting an initial curve according to the coordinates of the at least three first nodes;

acquiring coordinates of a second node of the image module when the robot rotates, and correcting the initial curve according to the coordinates of the second node and an error threshold to obtain a corrected curve; and in response to detecting that an intra-class distance of the corrected curve is less than a distance threshold, using the corrected curve as the target curve.

15. The storage medium of claim 14, wherein the computer program is configured to cause the processor to acquire the coordinates of the second node of the image module when the robot rotates, and correcting the initial curve according to the coordinates of the second node and the error threshold to obtain the corrected curve by:

calculating an error between the coordinates of the second node and the initial curve; and in response to the error between the coordinates of the second node and the initial curve being less than the error threshold, fitting the coordinates of the second node and the initial curve to obtain the corrected curve.

16. The storage medium of claim 13, wherein the computer program is configured to cause the processor to determine the coordinate offset of the image module relative to the body of the robot according to the target curve by:

determining the coordinates of the center and the radius of the target curve; and determining the coordinate offset of the image module relative to the body of the robot according to the coordinates of the center and the radius.

17. The storage medium of claim 13, wherein the computer program is configured to cause the processor to determine the relative distance between the image module and the target label according to the image module by:

fixing the target label carrying position information above a motion region of the robot; and determining the relative distance between the image module and the target label according to the target label photographed by the image module.

18. The storage medium of claim 13, wherein the computer program is configured to cause the processor to determine the pose information of the robot according to the coordinate offset and the relative distance by:

determining current global coordinates of the image module according to current global coordinates of the target label and the relative distance; and determining the pose information of the robot according to the current global coordinates of the image module and the coordinate offset.

* * * * *